(12) United States Patent
De Gier (10) Patent No.: US 9,822,938 B2
(45) Date of Patent: Nov. 21, 2017

(54) SOUND ABSORBING LIGHTING PANEL AND MODULAR SURFACE SYSTEM

(71) Applicant: PHILIPS LIGHTING HOLDING B.V., Eindhoven (NL)

(72) Inventor: Ronald Cornelis De Gier, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 5 days.

(21) Appl. No.: 14/652,572

(22) PCT Filed: Dec. 6, 2013

(86) PCT No.: PCT/IB2013/060695
§ 371 (c)(1),
(2) Date: Jun. 16, 2015

(87) PCT Pub. No.: WO2014/097042
PCT Pub. Date: Jun. 26, 2014

(65) Prior Publication Data
US 2016/0186942 A1 Jun. 30, 2016

Related U.S. Application Data

(60) Provisional application No. 61/738,485, filed on Dec. 18, 2012.

(51) Int. Cl.
*F21S 8/02* (2006.01)
*E04B 9/32* (2006.01)
(Continued)

(52) U.S. Cl.
CPC .......... *F21S 8/026* (2013.01); *E04B 9/32* (2013.01); *F21V 3/04* (2013.01); *F21V 3/0418* (2013.01);
(Continued)

(58) Field of Classification Search
CPC ........ F21S 8/026; E04B 9/001; E04B 9/0464; E04B 9/32; F21V 3/04; F21V 3/0409;
(Continued)

(56) References Cited

U.S. PATENT DOCUMENTS 2,710,335 A 6/1955 Wong
3,752,974 A 8/1973 Baker et al.
(Continued)

FOREIGN PATENT DOCUMENTS

CN 102581049 A 9/2012
EP 2476952 A2 7/2012
(Continued)

*Primary Examiner* — Alan Cariaso (57) ABSTRACT

Disclosed is a sound absorbing lighting panel (100) comprising a sound absorbing member (120); an optical medium (130) over said sound absorbing member; a first set (140) of solid state lighting elements (142) arranged along a first edge of said optical medium; a translucent sheet (150) over the optical medium, said translucent sheet having a non-uniform degree of translucency such as a higher degree of translucency over a central region of said optical medium than over a first region of said optical medium comprising said first edge. A modular surface system including such a sound absorbing lighting panel is also disclosed.

11 Claims, 6 Drawing Sheets

(51) Int. Cl.
  *F21V 3/04* (2006.01)
  *F21V 33/00* (2006.01)
  *F21V 11/14* (2006.01)
  *F21V 8/00* (2006.01)
  *E04B 9/00* (2006.01)
  *F21Y 105/00* (2016.01)
  *E04B 9/04* (2006.01)
  *F21Y 101/00* (2016.01)
  *F21Y 103/10* (2016.01)
  *F21Y 115/10* (2016.01)

(52) U.S. Cl.
  CPC ............ *F21V 3/0472* (2013.01); *F21V 11/14* (2013.01); *F21V 33/006* (2013.01); *G02B 6/0061* (2013.01); *E04B 9/001* (2013.01); *E04B 9/0464* (2013.01); *F21Y 2101/00* (2013.01); *F21Y 2103/10* (2016.08); *F21Y 2105/00* (2013.01); *F21Y 2115/10* (2016.08)

(58) Field of Classification Search
  CPC ...... F21V 3/0418; F21V 3/0472; F21V 11/14; F21V 33/006; G02B 6/0058; G02B 6/0061; F21Y 2105/00
  See application file for complete search history.

(56) References Cited

U.S. PATENT DOCUMENTS

| | | | |
|---|---|---|---|
| 5,532,440 A | 7/1996 | Fujiwara | |
| 5,782,551 A | 7/1998 | Capaul | |
| 6,367,581 B1 * | 4/2002 | Marler | ................ B66B 11/0226 181/295 |
| 8,591,052 B2 * | 11/2013 | Wheatley | ............. G02B 6/0035 345/102 |
| 8,834,004 B2 * | 9/2014 | Thompson | ........... G02B 6/0035 362/617 |
| 2010/0254121 A1 | 10/2010 | Zhou | |

FOREIGN PATENT DOCUMENTS

| | | |
|---|---|---|
| EP | 2581641 A1 | 4/2013 |
| JP | S61159514 A | 7/1986 |
| JP | 08297282 | 11/1996 |
| JP | 9115318 A | 5/1997 |
| JP | 2006040864 A | 2/2006 |
| JP | 2011040313 A | 2/2011 |
| WO | 2007092152 A2 | 8/2007 |
| WO | 2011155537 A1 | 12/2011 |
| WO | 2012156060 A1 | 11/2012 |
| WO | 2013050908 A1 | 4/2013 |

* cited by examiner

SOUND ABSORBING LIGHTING PANEL AND MODULAR SURFACE SYSTEM

CROSS-REFERENCE TO PRIOR APPLICATIONS

This application is the U.S. National Phase application under 35 U.S.C. §371 of International Application No. PCT/IB13/060,695, filed on Dec. 06, 2013, which claims the benefit of U.S. Provisional Patent Application No. 61/738,485, filed on Dec. 18, 2012. These applications are hereby incorporated by reference herein.

FIELD OF THE INVENTION

The present invention relates to a sound absorbing lighting panel comprising a sound absorbing member, an optical medium over said sound absorbing member and a first set of solid state lighting elements arranged along a first edge of said optical medium. The present invention further relates to a modular surface system comprising such a sound absorbing lighting panel.

BACKGROUND OF THE INVENTION

In construction, modular surface systems are commonly used to reduce build cost and construction time. Modular surface systems typically allow for the rapid construction of floors, walls and ceilings, albeit often at the compromise of reduced aesthetic appearance. A prime example of such a modular surface system is a suspended ceiling, which can be found in most professional environments, such as for example office spaces. A suspended ceiling typically comprises a metal or plastic grid defining rectangular or square recesses, which are filled with panels or tiles to form a continuous ceiling.

In such modular systems, e.g. a suspended ceiling, lighting may be integrated into the system, typically by replacing one or more tiles with a lighting unit such as a luminaire. Most suspended ceilings comprise luminaires in which a number of fluorescent light tubes are present. For a number of reasons, such luminaires are not ideal. Firstly, such luminaires are considered aesthetically displeasing, i.e. obtrusive. Secondly, in order to improve light efficiency from such luminaires, they usually contain a reflector, which commonly has a parabolic shape. This however can cause glare for an occupant of the office space if the reflected light exits the luminaire under shallow angles to the plane of the modular system. Moreover, in applications where it is necessary to suppress noise levels, it may be required for the panels or tiles of the modular surface system to absorb sound, for which the aforementioned luminaires are unsuitable.

U.S. Pat. No. 6,367,581 B1 discloses a sound absorbing light fixture for a ceiling system. The light fixture comprises an air-filled cavity comprising a light source such as an incandescent light bulb in between a micro-perforated film acting as a porous light diffuser and a sound absorbing material. The air-filled cavity forms a standing wave sound field inside the cavity, in which the sound absorption coefficient can be optimized by improving the acoustic performance of the porous diffuser, the air-filled cavity and the sound absorbing material. Such light fixtures are however rather bulky.

It is known per se that small form factor lighting panels for modular surface systems can be achieved using solid state lighting elements such as light emitting diodes (LEDs). However, such solid state lighting elements are rather expensive compared to incandescent or fluorescent light sources, such that there is a desire to provide lighting panels comprising a small number of solid state lighting elements. Also, the heat produced by the solid state lighting elements limits the number of solid state lighting elements that can be applied per unit area of the lighting panel.

An example of a lighting panel including solid state lighting elements is disclosed in US 2004/0070967 A1. The acoustic light-emitting module includes a backing panel, a cover and a rigid spacing member extending between the backing panel and the cover, with a ring of solid state lighting elements such as LEDs placed inside the module. A problem with this acoustic light-emitting module is that the light output is inhomogeneous, which is aesthetically displeasing. Also, this solution requires a relatively large number of solid state elements, which is costly.

Another solution is to place solid state lighting elements at the edges of the lighting panels and use optical mirrors to produce a homogeneous light output. Such additional optics significantly increases the cost of the lighting panels. A solution avoiding such optical mirrors is disclosed in U.S. Pat. No. 3,752,974 in which uniform illumination is provided from an edge lighted optical medium of a given thickness by diffusing a surface portion normally providing internal reflection of the light radiated into the edge such that at least some of the light rays striking the diffused area are reflected through the opposite surface of the medium and some are refracted through the one surface. A cleared area about the source of light free of the diffusion is provided and treated by application of coatings on opposite surface portions of the medium defining the cleared area. These coatings have an index of refraction less than that of the medium such that light is channeled by internal reflection between the surfaces of the medium and inhibited from escaping from the medium in the vicinity of the cleared area. This cleared area has a radius of preferably three to four times the thickness of the optical medium. The resulting light emanation from the surface of the medium is substantially uniform beyond the cleared area. This solution however still is relatively complex, i.e. costly to manufacture.

SUMMARY OF THE INVENTION

The present invention seeks to provide a sound absorbing lighting panel that at least in some embodiments may produce a homogeneous light output and can be manufactured in a cost-effective manner.

The present invention further seeks to provide a modular surface system comprising at least one such sound absorbing lighting panel.

In accordance with a first aspect of the present invention, there is provided a sound absorbing lighting panel comprising a sound absorbing member an optical medium over said sound absorbing member; a first set of solid state lighting elements arranged along a first edge of said optical medium; a translucent sheet over the optical medium, said translucent sheet having a non-uniform degree of translucency over said optical medium.

In the context of the present application, an optical medium may be any medium through which light can propagate, for example air, a transparent material, an optical wave guide and so on.

In a particularly preferred embodiment, said translucent sheet has a higher degree of translucency over a central region of said optical medium than over a first region of said optical medium comprising said first edge.

The present invention is based on the insight that by providing a translucent sheet that has a non-uniform translucency, e.g. is more translucent in the centre of the sound absorbing lighting panel than at its edges, a higher degree of internal reflection is achieved in the optical medium than in the centre such that a predefined, e.g. homogeneous, light output can be produced over the (whole) area of the sound absorbing lighting panel without requiring expensive optical elements such as optical mirrors. Instead of a homogeneous light output, the degree of translucency may also be tuned to create shapes such as characters or logos at the luminous surface of the sound absorbing lighting panel.

Preferably, the sound absorbing lighting panel further comprises a second set of solid state lighting elements arranged along a second edge opposite said first edge of said optical medium, wherein the translucent sheet has a higher degree of translucency over said central region that over a second region of said optical medium comprising said second edge. This further improves the homogeneity of the light output of the sound absorbing lighting panel. The degree of translucency in the portions of the translucent sheet over the first and second regions may be the same.

In an advantageous embodiment, the solid state lighting elements may comprise a strip of light emitting diodes, which is a low-cost embodiment of such solid state lighting elements.

Preferably, the translucent sheet comprises a plurality of openings covering at least 3% of its total surface, as this ensures that a sufficient number of sound waves can effectively penetrate the sound absorbing lighting panel and be absorbed by the sound absorbing member.

In an embodiment, the translucent sheet comprises a glass fibre mat coated with an opaque paint, wherein the opaque paint coating has a larger thickness over the first region than over the central region.

In an alternative embodiment, the translucent sheet comprises a perforated plastic or metal sheet having a more open structure over the central region than over the first region. The more open structure may for instance comprise a higher perforation density.

Advantageously, the sound absorbing lighting panel further comprises a housing containing the optical medium, the solid state lighting elements and the translucent sheet, said housing having reflective inner surfaces. This improves the light output of the sound absorbing lighting panel, such that a smaller number of solid state lighting elements are required to achieve desired lighting levels.

The sound absorbing lighting panel preferably has a tile shape such that it can be fitted into a modular surface system.

In accordance with another aspect of the present invention, there is provided a modular surface system comprising a plurality of panels mounted in a support frame, wherein at least one of said panels is a sound absorbing lighting panel according to an embodiment of the present invention. Such a system benefits from lower manufacturing cost whilst maintaining pleasing aesthetics due to the homogeneous nature of the light output of the sound absorbing lighting panels of the present invention.

In an embodiment, the surface system is a suspended ceiling system.

BRIEF DESCRIPTION OF THE EMBODIMENTS

Embodiments of the invention are described in more detail and by way of non-limiting examples with reference to the accompanying drawings, wherein.

DETAILED DESCRIPTION OF THE DRAWINGS

It should be understood that the figures are merely schematic and are not drawn to scale. It should also be understood that the same reference numerals are used throughout the figures to indicate the same or similar parts.

Figure 1:
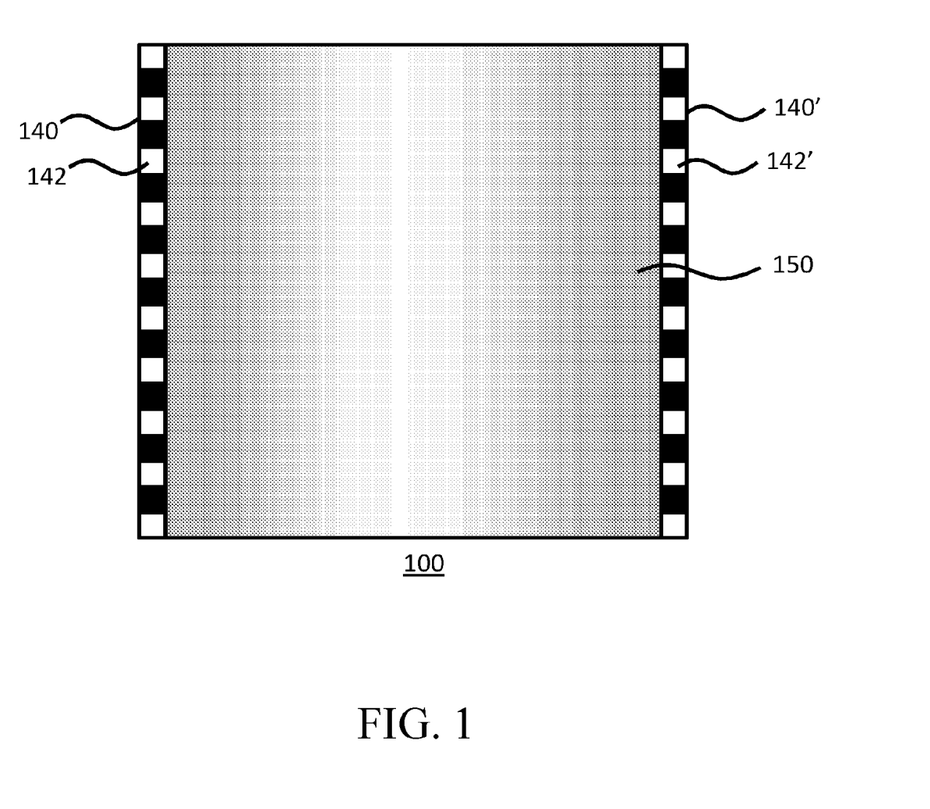
FIG. 1 schematically depicts an aspect of sound absorbing lighting panel according to an embodiment of the present invention.
Figure 2:
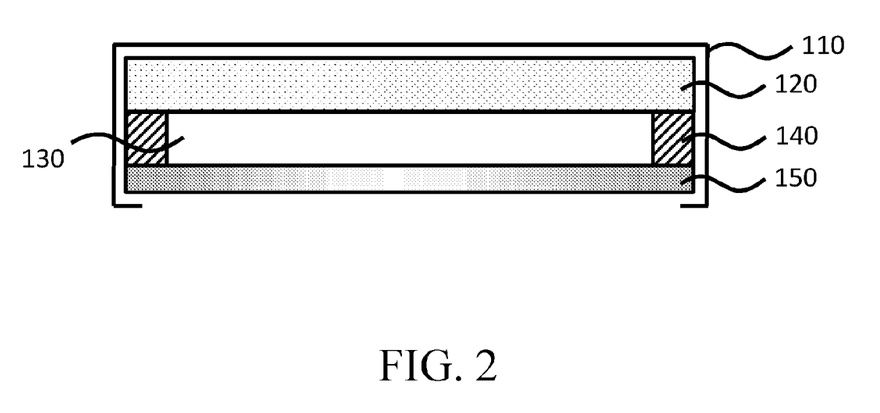
FIG. 2 schematically depicts another aspect of sound absorbing lighting panel according to an embodiment of the present invention.

FIG. 1 schematically depicts a bottom view of a sound absorbing lighting panel 100 according to an embodiment of the present invention, whereas FIG. 2 schematically depicts a cross-section of the sound absorbing lighting panel 100. The sound absorbing lighting panel 100 comprises a housing 110 in which a sound absorbing member 120 is placed. The sound absorbing member 120 may be made of any suitable material, such as a woven or non-woven fabric, acoustic foam such as melamine foam, fibreglass, cork, and so on.

An optical medium 130 is placed over the sound absorbing member 120, which has a first set 140 of solid state lighting elements 142 placed along a first edge and a second set 140' of solid state lighting elements 142' placed along a second edge opposite the first edge of the optical medium 130. Any suitable solid state lighting element, e.g. light emitting diodes such as high-brightness LEDs or organic LEDs or electroluminescent elements may be used. In a preferred embodiment, the sets 140 and 140' comprise strips of LEDs. In an embodiment, the sets 140 and 140' are adhered, e.g. glued, to the optical medium 130. In an alternative embodiment, the sets 140 and 140' are integrated in the optical medium 130. In yet another embodiment, the sets 140 and 140' are fixated against the optical medium 130, e.g. using clips or the like. In yet another embodiment, the sets 140 and 140' are fixated against the housing 110. It should be understood that the sets 140 and 140' of solid state lighting elements 142 and 142' may be placed at the opposite edges of the optical medium 130 in any suitable manner. It should furthermore be understood that the present invention is not limited to a sound absorbing lighting panel 100 comprising two sets of solid state lighting elements; any suitable number of sets on any number of sides, e.g. along all sides, of the sound absorbing lighting panel 100 or optical medium 130, may be used.

In accordance with the present invention, the sound absorbing lighting panel 100 further comprises a translucent sheet 150 having a higher translucency in a central area of the sound absorbing lighting panel 100 than at the edges of the sound absorbing lighting panel 100 where the solid state lighting elements 142 and 142' are located. This is indicated in FIGS. 1 and 2 by the grayscale gradient in the translucent sheet 150, in which a lighter tone indicates a higher translucency. In other words, the translucent sheet 150 has a translucency gradient that is increasing from an edge portion of the sound absorbing lighting panel 100 where the solid state lighting elements 142, 142' are located to the centre of the sound absorbing lighting panel 100.

Figure 3:
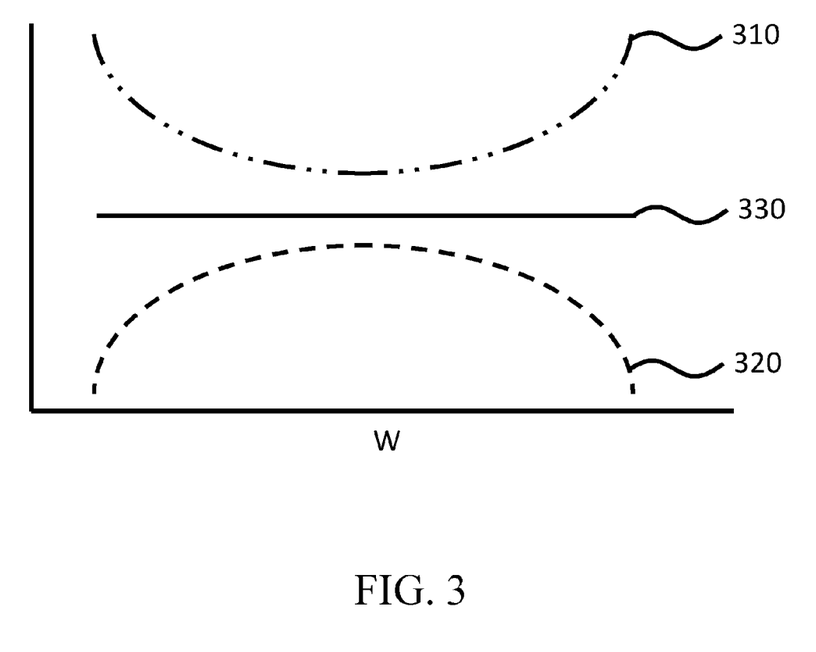
FIG. 3 schematically depicts the concept of the sound absorbing lighting panel of the present invention.

The purpose of this translucency gradient is explained with the aid of FIG. 3, which gives a schematic representation of the light distribution 310 in the optical medium 130, the translucency 320 of the translucent sheet 350 and the light output intensity 330 of the sound absorbing lighting panel 100 as a function of the width profile W of the sound absorbing lighting panel 100, in which the edges of the profile correspond with the edges of the sound absorbing lighting panel 100 at which the solid state lighting elements 142, 142' are located and the centre of the profile corresponds with the centre of the sound absorbing lighting panel 100.

The light distribution profile 310 is the direct result of the solid state lighting elements 142, 142' being placed at the edges of the sound absorbing lighting panel 100. Due to the fact that a fraction of the light emitted into the optical medium 130 does not internally reflects inside this member but is diffracted out of this member instead, the light intensity inside the optical medium 130 continually decreases from the edge of the sound absorbing lighting panel 100 towards its centre.

Without any additional measures, this would result in a light output having the light distribution profile 310, i.e. a non-homogeneous light output profile in which the edges of the sound absorbing lighting panel 100 would appear brighter than its centre, which is aesthetically unappealing. This is compensated by the translucency gradient 320 in the translucent sheet 150, which ensures that less light can escape the optical medium 130 near the edges of the sound absorbing lighting panel 100 compared to the central region of this panel, such that the resulting light output profile 330 of the sound absorbing lighting panel 100 is homogeneous, i.e. of constant intensity over the width W of the sound absorbing lighting panel 100. Hence, by balancing the placement and output intensity of the solid state lighting elements 142, 142' and the translucency of the translucent sheet 150, a homogeneous light output can be achieved for the sound absorbing lighting panel 100.

In an embodiment, the optical medium 130 is an air-filled cavity delimited by the housing 110, in which case the translucent sheet 150 may be fitted to the surface of an extraction member (not shown) facing the optical medium 130 such that the optical medium 130 is located in between the extraction member and the sound absorbing member 120. Alternatively, the translucent sheet 150 may be fitted to the housing 110 or may be fitted in any other suitable manner. In this embodiment, the sound absorbing member 120 may further comprise a reflective surface facing the optical medium to reduce absorption of the emitted light by the sound absorbing member 120. Although an air-filled cavity is preferable, it should however be understood that any suitable optical medium 130, e.g a light guide, may be used instead.

In an embodiment, the translucent sheet 150 may comprise a woven fabric such as a fibreglass weave or one or more non-woven sheets. The translucency gradient may be achieved in such a (non-)woven material by applying an opaque paint to the material and increasing the thickness of the paint towards the edges of the sound absorbing lighting panel 100 where the solid state lighting elements 142, 142' are placed. Alternatively, in case of a woven material, the translucency gradient may also be achieved using a weaving technique in which the material has a more open weave towards the centre of the material when placed in the sound absorbing lighting panel 100.

Figure 4:
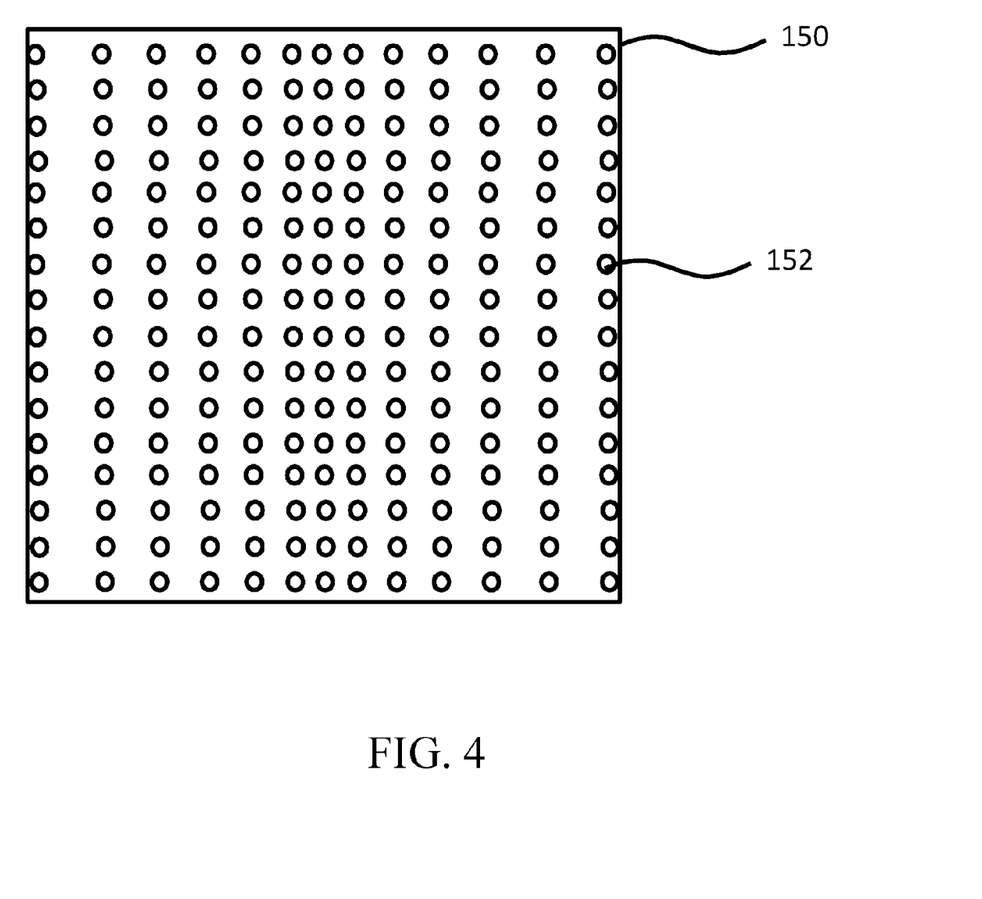
FIG. 4 schematically depicts an aspect of sound absorbing lighting panel according to another embodiment of the present invention.

An alternative embodiment of the translucent sheet 150 is shown in FIG. 4. In this embodiment, the translucent sheet 150 comprises a pattern of perforations 152, which pattern has a higher perforation density in the centre of the sound absorbing lighting panel 100 compared to the edge regions of the sound absorbing lighting panel 100 where the solid state lighting elements 142 and 142' are located to achieve the translucency gradient 320 in the translucent sheet 150.

Figure 5:
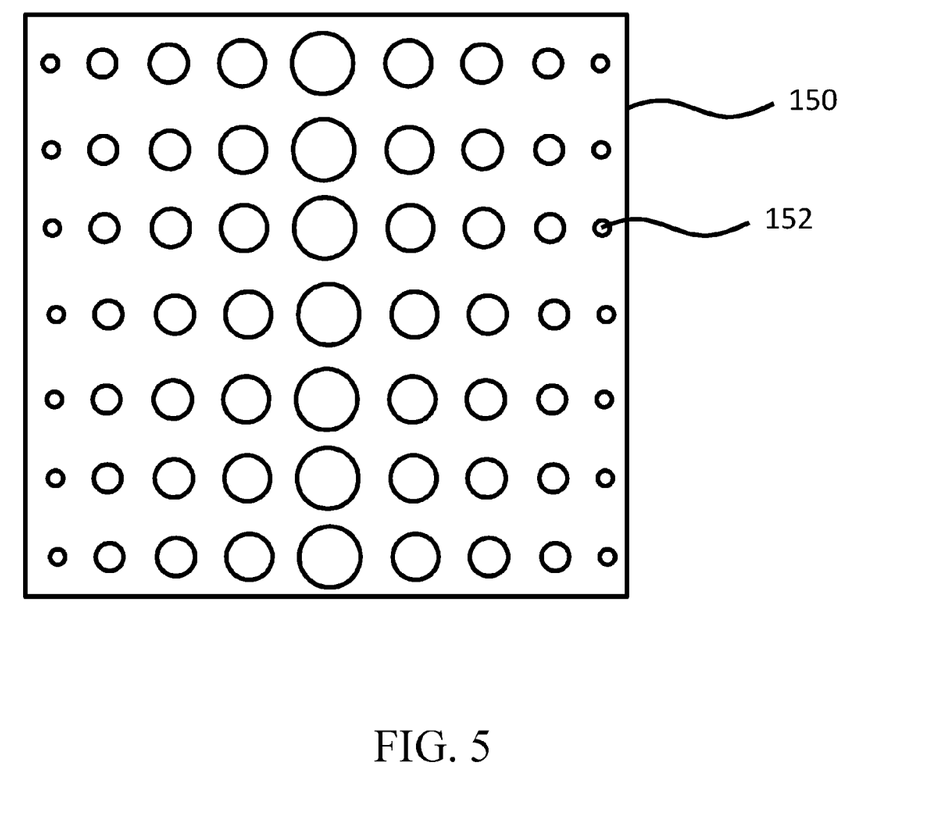
FIG. 5 schematically depicts an aspect of sound absorbing lighting panel according to yet another embodiment of the present invention.

Yet another alternative embodiment of the translucent sheet 150 is shown in FIG. 5. In this embodiment, the translucent sheet 150 comprises a pattern of perforations 152 in which the diameter of the perforations 152 increases towards the centre of the sound absorbing lighting panel 100 to give the sound absorbing lighting panel 100 a more open structure towards its centre, thus achieving the desired gradient in the translucency of the translucent sheet 150. In the embodiments of FIG. 4 and FIG. 5, the translucent sheet 150 may be formed of any suitable material that may be perforated, such as a metal or plastic sheet.

At this point, it is noted that the translucent sheet 150 should a surface area of which at least 3% consists of openings to allow sound waves to effectively travel through the translucent sheet 150 towards the sound absorbing member 120. The openings preferably should be distributed evenly over the surface of the translucent sheet 150 to ensure that the whole surface of the sound absorbing lighting panel 100 is capable of absorbing sound waves.

It is also preferable that the housing 110 comprises reflective inner surfaces to avoid light escaping sideways from the sound absorbing lighting panel 100, thus maximizing the light efficiency of the sound absorbing lighting panel 100.

It should be understood that several variations are possible to the embodiments shown in FIGS. 1 to 5 without departing from the teachings of the present invention. For instance, the sound absorbing lighting panel 100 may comprise any suitable arrangement of further optical elements, e.g. beam shaping elements, diffusers, light extraction coatings, and so on.

Also, although the sound absorbing lighting panel 100 preferably contains a first set 140 of solid state lighting elements 142 and a second set 140' of solid state lighting elements 142' at opposite edges of the optical medium 130, it should be understood that one of the sets 140 and 140' may be omitted, thus yielding a sound absorbing lighting panel 100 comprising a single set of solid state lighting elements along a single edge of the optical medium 130. In this embodiment, the translucent sheet 150 has a translucency gradient that continuously increases from the edge of the optical medium 130 where the single set of solid state lighting elements are located towards the opposite edge of the optical medium 130.

Figure 6:
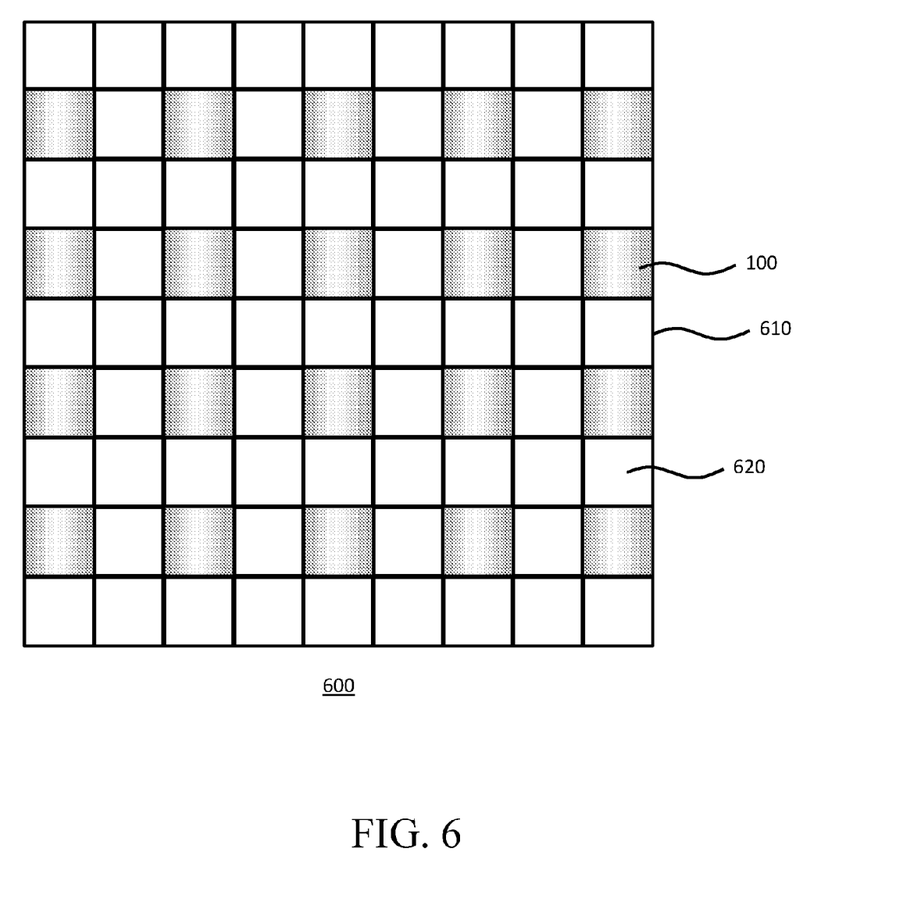
FIG. 6 schematically depicts a modular surface system according to an embodiment of the present invention.

FIG. 6 schematically depicts an embodiment of a modular surface system 600 of the present invention, e.g. a suspended ceiling system. The modular surface system 600 comprises a support frame 610 into which a plurality of surface tiles 620 are suspended. At least some of the surface tiles 620 are sound absorbing lighting panels 100 according to one or more embodiments of the present invention. The support frame 610 may be attached to the surface in any suitable manner. As many different fixation methods are well-known per se, this will not be explained in further detail for the sake of brevity only.

It should furthermore be understood that the tile size and shapes in FIG. 6 are shown by way of non-limiting example only. Any suitable tile size and shape may be chosen.

At least some of the aforementioned embodiments of the present invention are designed to produce a uniform light distribution over the surface of the sound absorbing lighting panel 100. However, it should be understood that it is equally feasible to provide the translucent sheet 150 with a translucency distribution that generates a non-uniform light distribution, e.g. to highlight shapes such as characters or letters, logos, trademarks, images and so on.

It should also be understood that multiple sheets of the translucent sheet 150 may be combined in order to achieve the desired translucency distribution at the luminous surface of the sound absorbing lighting panel 100.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The invention can be implemented by means of hardware comprising several distinct elements. In the device claim enumerating several means, several of these means can be embodied by one and the same item of hardware. The mere fact that certain measures are recited in mutually different dependent claims does not indicate that a combination of these measures cannot be used to advantage.

The invention claimed is:

1. A sound absorbing lighting panel comprising:
   a sound absorbing member;
   an optical medium over the sound absorbing member;
   a first set of solid state lighting elements arranged along a first edge of the optical medium; and
   a translucent sheet over the optical medium, the translucent sheet comprising a glass fiber mat coated with an opaque paint,
   wherein the opaque paint coating has a larger thickness over a first region of the optical medium comprising the first edge than over a central region of the optical medium so that the translucent sheet has a higher degree of translucency over the central region than over the first region.

2. The sound absorbing lighting panel of claim 1, wherein the first set of solid state lighting elements comprises a strip of light emitting diodes.

3. The sound absorbing lighting panel of claim 2, further comprising a second set of solid state lighting elements arranged along a second edge opposite the first edge of the optical medium, wherein the translucent sheet has a higher degree of translucency over the central region than over a second region of the optical medium comprising the second edge.

4. The sound absorbing lighting panel of claim 3, wherein the second set of solid state lighting elements comprises a further strip of light emitting diodes.

5. The sound absorbing lighting panel of claim 1, wherein the translucent sheet comprises a plurality of openings covering at least 3 % of its total surface.

6. The sound absorbing lighting panel of claim 1, further comprising a housing containing the sound absorbing member, the optical medium, the solid state lighting elements and the translucent sheet, the housing having reflective inner surfaces.

7. The sound absorbing lighting panel of claim 1, wherein the panel has a tile shape.

8. The sound absorbing lighting panel of claim 1, wherein the translucent sheet has a translucency gradient that is increasing from an edge portion of the sound absorbing lighting panel to the center of the sound absorbing lighting panel.

9. The sound absorbing lighting panel of claim 1, wherein the optical medium comprises an air-filled cavity.

10. A modular surface system comprising a plurality of panels mounted in a support frame, wherein at least one of said panels is a sound absorbing lighting panel according to claim 1.

11. The modular surface system of claim 10, wherein the surface system is a suspended ceiling system.

* * * * *